United States Patent [19]

Eccles et al.

[11] 4,038,526

[45] July 26, 1977

[54] OPTIMIZING CONTROL SYSTEM FOR AIRCRAFT

[75] Inventors: Edward Stuart Eccles, Cheltenham; David James Moore, Bristol, both of England

[73] Assignee: The Secretary of State for Defence in Her Britanic Majesty's governmentof the United Kingdom of Great Britain and Northern Ireland, London, England

[21] Appl. No.: 640,862

[22] Filed: Dec. 15, 1975

Related U.S. Application Data

[63] Continuation of Ser. No. 419,654, Nov. 28, 1973, abandoned.

[30] Foreign Application Priority Data

Dec. 29, 1967  United Kingdom ............... 59029/67

[51] Int. Cl.² ...................... G06F 15/46; G06F 15/06
[52] U.S. Cl. ................................. 235/150.1; 60/39.15; 60/710; 235/150.21
[58] Field of Search .................. 235/150.1, 150.21; 60/39.15, 704, 710–711, 719

[56] References Cited

U.S. PATENT DOCUMENTS 3,174,284  3/1965  McCarthy ........................... 60/39.15
3,299,630  1/1967  Alper .................................. 60/39.15
3,403,507  10/1968  Schuster ............................. 60/39.15
3,517,509  6/1970  Bayati ................................ 60/39.15
3,758,764  9/1973  Harner .............................. 235/150.1

OTHER PUBLICATIONS

Anderson et al., "A Self-Adjusting System for Optimum Dynamic Performance", IRE Nat'l Convention Record, vol. 6 pt. 4, 3-1958, pp. 182-190.

Douce et al., "A Self-Optimizing Non-Linear Control System", Proceedings of Inst. of Elec. Engineers, part B vol. 108 No. 40, 7-1961, pp. 441-448.

*Primary Examiner*—Jerry Smith
*Attorney, Agent, or Firm*—Mawhinney & Mawhinney & Connors

[57] ABSTRACT

The disclosure of this invention pertains to a system for optimizing fuel consumption in an aircraft having two engines, wherein a computer is programmed to increase the fuel flow to the engine which, consequent upon a fuel flow perturbation, shows itself to be responsible for the greater acceleration of the aircraft. Direction changes resulting from unequal fuel flows to the engines are compensated for by automatic rudder control, and speed changes resulting from the fuel flow changes are compensated for by automatic speed control also acting on fuel flow, all whereby direction and speed of flight are maintained while fuel consumption is minimized.

4 Claims, 15 Drawing Figures

OPTIMIZING CONTROL SYSTEM FOR AIRCRAFT

This application is a continuation of application Serial No. 419,654, filed Nov. 28, 1973. (Now abandoned).

This invention relates to an optimizing control system for aircraft.

In an aircraft having a power plant comprising two or more engines, the operating efficiency of the power plant may be adversely affected if the operating efficiency of the individual engines is not the same. The object of this invention is to provide a system for optimizing the operating efficiency of the power plant.

According to this invention there is provided a system for optimizing the operating efficiency of a power plant of an aircraft having at least two engines having respective gross thrusts versus fuel flow characteristics and positioned on opposite sides of the longitudinal axis of the aircraft, a speed control loop for maintaining the speed of the aircraft substantially constant, and a direction control loop for maintaining the direction of the aircraft substantially constant, which achieves a method for optimizing the operating efficiency of the power plant to account for differences in the efficiencies of the engines by adjustably proportioning fuel flow to the engines. The method comprises the steps of: (a) simultaneously perturbing the fuel flow to each of the two engines in a small amount, the respective perturbations being opposite in sign; (b) sensing acceleration in the aircraft flight direction produced in response to the perturbations of step (a); (c) comparing the sign of the perturbation in fuel flow to one of the engines with the sign of acceleration sensed as a result of the perturbations in fuel flow to the engines to determine if the signs are the same or opposite; (d) if the compared signs are the same, increasing fuel flow to the one engine and decreasing fuel flow by a like amount to the other of the engines; (e) if the compared signs are opposite, decreasing fuel flow to the one engine and increasing fuel flow by a like amount to the other engine; and (f) repeating steps (a) through (e) until no net acceleration is sent in response to perturbations of the fuel flow to the engines.

An example of a system according to this invention will now be described with reference to the accompanying drawings wherein.

Figure 1:
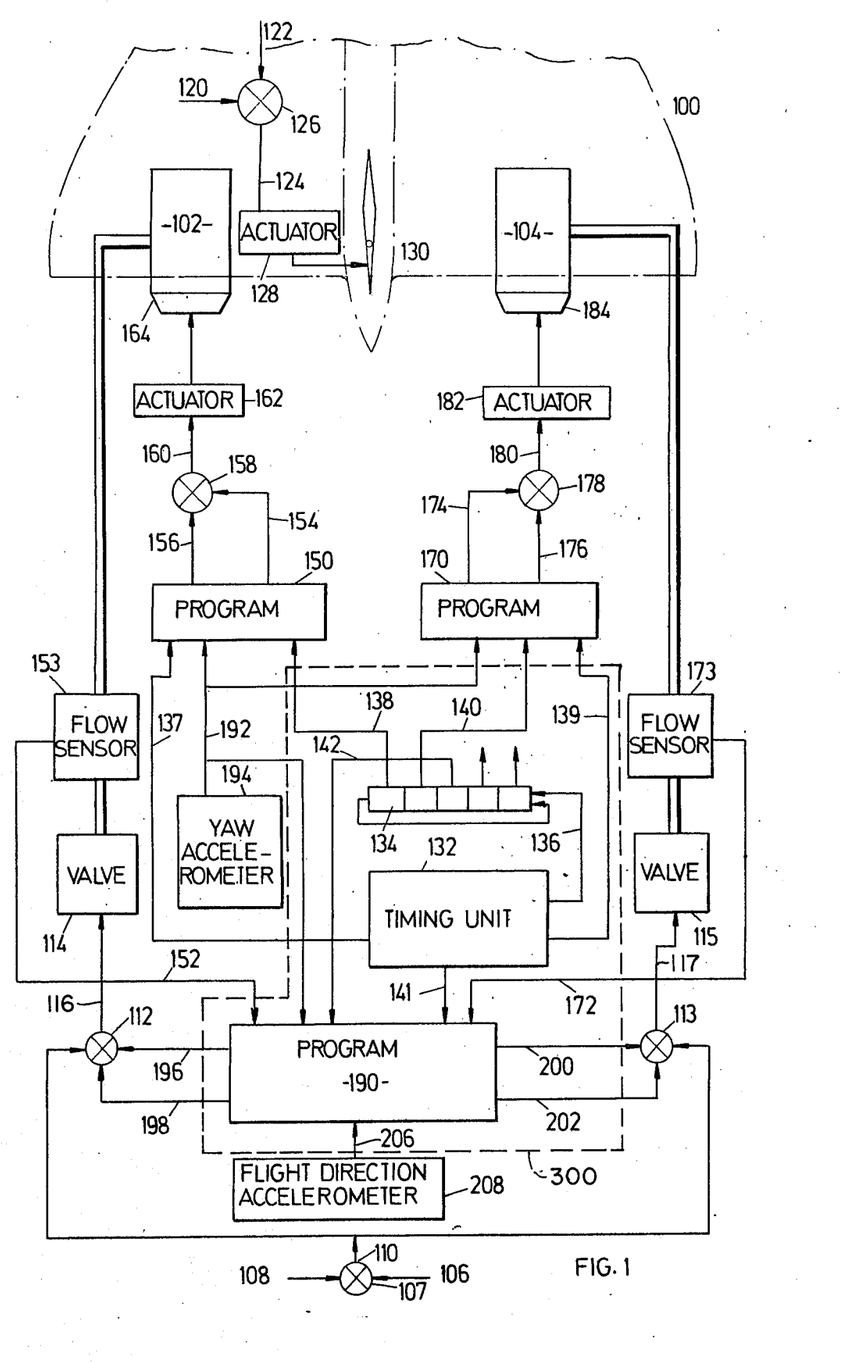
FIG. 1 is a portion of an aircraft shown in plan view and a block diagram of the system as applied to the aircraft.

Referring to FIG. 1, the aircraft, generally denoted 100, includes two engines 102, 104, situated on opposite sides of the longitudinal axis of the aircraft. The purpose of the system is to optimize the operating efficiency of the aircraft by optimizing the specific fuel consumption of the engines for a given speed and direction of flight. The flight speed is controlled by a speed demand signal 106 fed to a summing junction 107 together with a signal 108 of actual speed to produce an error signal 110 which is fed equally through two summing junctions 112, and thence by signals 116, 117 113, to two throttle valves 114, 115 to adjust by equal amounts the fuel flow in the fuel lines passing from the two valves to the respective engines 102, 104. The loop 108, 110 is the "speed control loop". The flight direction is controlled by signals 120, 122 of demanded and actual direction, respectively, being fed to a summing junction 126 to produce an error signal 124 acting through an actuator 128 on a rudder 130 of the aircraft tail structure to adjust the rudder angle to keep flight direction constant. The loop 122, 124 is the "direction control loop". Optimization of fuel consumption is achieved (a) by minimizing the fuel consumption of the individual engines, and (b) utilizing the engines according to their respective fuel efficiencies.

Figure 4:
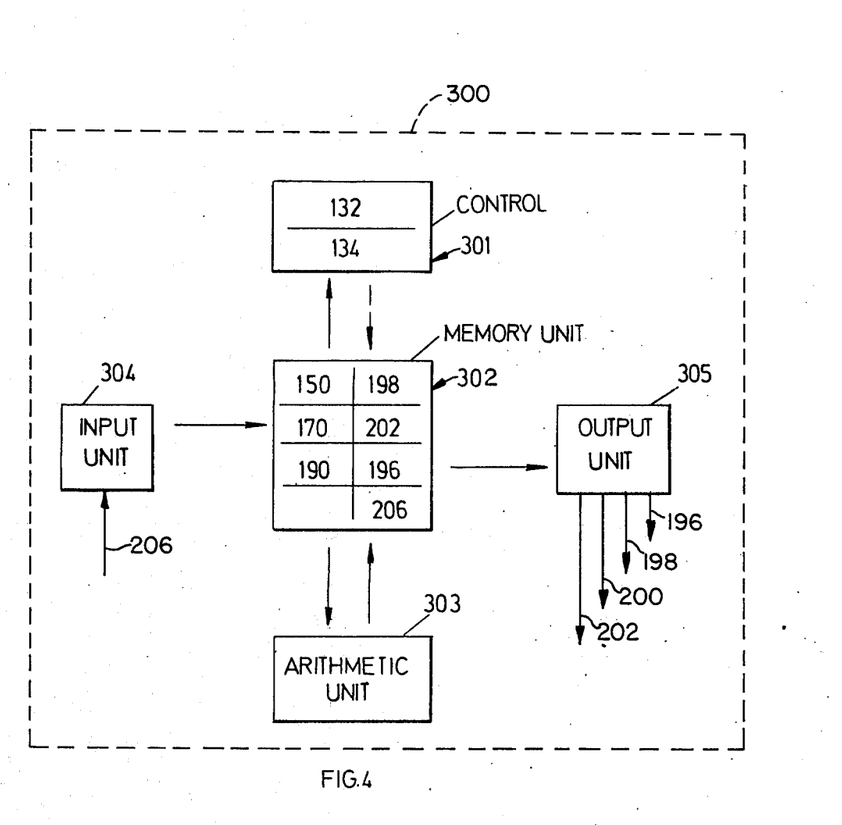
FIG. 4 is a diagram of a general purpose digital computer storing data and programs relating to the system.

The optimization process is carried out by a digital computer 300 (FIGS. 1 and 4) under the control of programs 150, 170, 190 which are initiated in cyclic sequence by signals 137, 139, 141, respectively, from a timing unit 132 including a shift register 134 operated by a clock pulse 136 to produce a series of three pseudo-random binary numbers (PRBN) shown as signals 138, 140, 142, respectively. The timing units 132 is adapted to be engaged or disengaged by the crew of the aircraft. An example of a known computer layout is shown in FIG. 4 as comprising a control unit 301, a memory unit 302, an arithmetic unit 303, and input and output units 304, 305. Reference numerals relating to the control and memory aspects of the invention are shown in FIG. 4 and will be referred to as further details of the invention are described.

Optimization of the fuel consumption of the engines 102, 104 is carried out respectively by the programs 150, 170 by which control or input parameters, other than fuel flow, of the respective engines are subjected to perturbations affecting thrust, which input parameters are then corrected to maximize thrust. The engines are dealt with individually and the thrust produced by the perturbations is sensed in terms of an operating parameter, in this case the yaw acceleration produced by the individual engines. Any increase in thrust tends to increase speed and causes the speed control loop 108, 110 to reduce fuel flow, and vice versa. The response of the speed control loop is, as stated, to change the fuel flows to the respective engines by equal amounts. No action is taken at this stage if the engines respond unequally to equal perturbations or respond unequally to equal fuel flow changes, but any change in the yaw attitude of the aircraft is automatically compensated for by the direction control loop 122, 124.

It will be clear that the timing unit 132 is engaged to initiate the cycle of program only after the speed and direction control loops are steady in operation.

Figure 5:
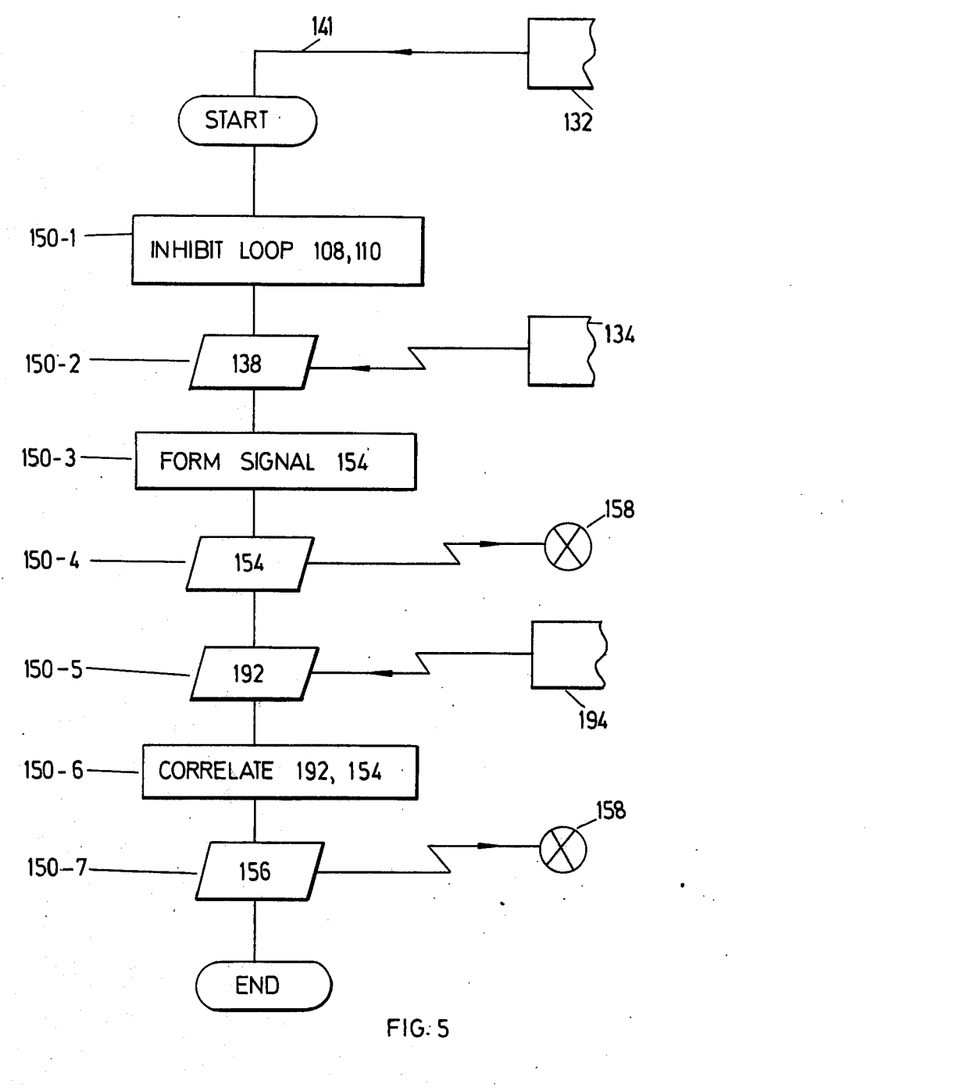
FIGS. 5, 6 and 7a, 7b are flow diagrams of programs stored in the computer.

As shown in FIGS. 1 and 5 the program 150 is adapted to read the PRBN signals 138 and a yaw acceleration signal 192 from a yaw accelerometer 194. The program can produce a perturbation signal 154 and a correction signal 156. The latter signals are fed to a summing junction 158 having an output 160 to an actuator 162 for varying the area of the jet nozzle 164, of the engine 102. The program 150 (FIG. 5) is shown to comprise operations 150-1 to 150-7. Operation 150-1 is for inhibiting the speed control loop 108, 110 so that the aircraft can undergo the acceleration or deceleration necessary for the purposes of the program. Operation 150-2 is for reading the signal 138. Operation 150-3 is for forming the perturbation signal 154. Details of how a signal such as 154 is generated are given later herein with reference to the program 190. Operation 150-5 is for reading the yaw acceleration and hence maximum thrust. The signal 156 is output to the summing junction 158 by operation 150-7. Details of a correlation such as is required for operation 150-6 are given later herein with reference to the program 190.

Figure 6:
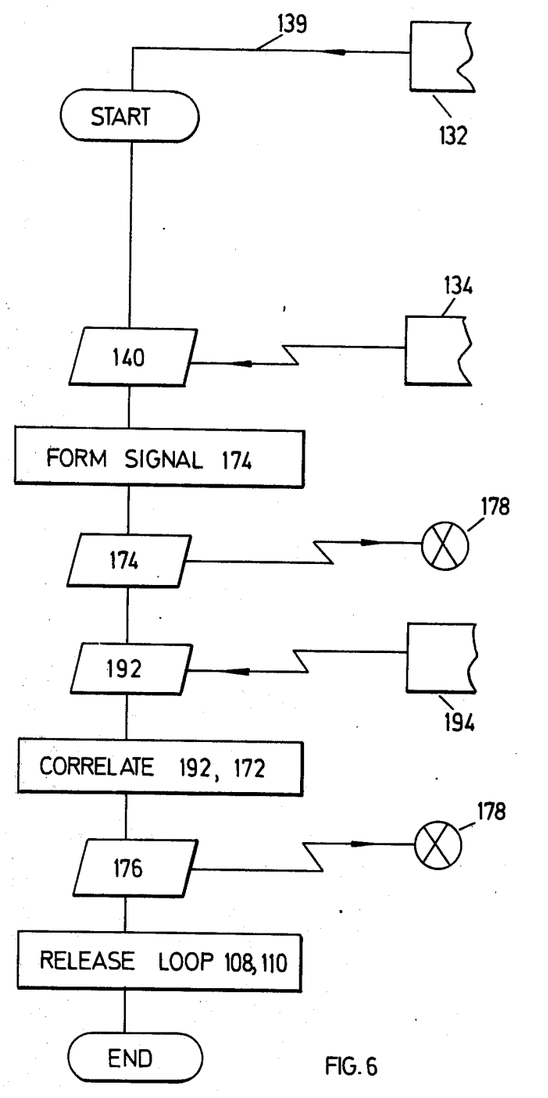

On completion of the program 150 the timing unit initiates the program 170 (FIG. 6) which carries out the corresponding optimization for the engine 104 and is in all respects the same as the program 150 but is initiated by the signal 139, reads the PRBN as signal 140, and has as its last step the command to release the speed control loop 108, all as shown in FIG. 6. The outputs of the program 170 are a perturbation signal 174 and correction signal 176 both fed to a summing junction 178 having an output 180 to an actuator 182 for varying the area of the jet nozzle, 184, of the engine 104.

Increases in thrust due to the improvement in engine performance brought about by the operation of the programs 150, 170 may result in an increase in drag if the engines respond unequally and produce an increase in the yaw couple on the aircraft which has to be balanced by the direction control loop 122, 124. The net increase in forward thrust produces aircraft speed changes which are corrected by the speed control loop 108, 110 operating equally through the summing junctions 112, 113 to reduce the fuel flow to both engines.

Programs such as those denoted 150, 170 have been described in detail in our co-pending United States patent application Ser. No. 785,270 filed Dec. 19, 1968 now abandoned. The programs 150, 170 may each read more than one PRBN with a view of simultaneously varying more than one input parameter of the engine and a system for doing this is described in said abandoned U.S. Pat. application Ser. No. 785,270.

Thus there may be a shift register such as the register 134 but containing a PRBN sequence having a number of digits equal to or greater than the number of engines multiplied by the number of variable input parameters per engine, and the programs for the respective engines may be organized to read such an enlarged shift register in any order, i.e., any one program need not necessarily read consecutive channels of the register. Thus, for example, it may be preferred for the selected input parameter, e.g., the nozzles of all the engines, to be perturbed from consecutive channels of the register.

Programs 150, 170 are concerned with the optimization of the fuel consumptions of the individual engines 102, 104 and are a desirable preliminary to program 190 which is concerned with the best utilization of the engines according to their respective fuel efficiencies, i.e., with making most use of the better and least use of the worse of two engines. This is done by varying the ratio of the fuel flows to the two engines while maintaining a generally constant speed and direction of flight. Said ratio is taken to rise if the fuel flow to the more efficient engine, i.e., the engine having the lower specific fuel consumption, is increased while the fuel flow to the other engine is decreased. Raising the fuel ratio results at first in a reduction but beyond a certain point in an increase in total fuel consumption. This is so because to raise the fuel ratio also results in an increase in rudder drag on the aircraft because of the need to balance the yaw couple arising from the increase in the thrust of the one and decrease in the thrust of the other engine; there is therefore an optimum fuel ratio such that, at constant speed and direction of flight, lowering the fuel ratio from the optimum leads to an increase in total fuel consumption on account of bad engine utilization while raising of the fuel ratio above the optimum leads to an increase in total fuel consumption on account of increased drag.

The program 190 (FIGS. 7a, 7b) has access to the PRBN signal 142, to the fuel flow signals 152, 172 from flow sensors 153, 173 respectively, and to a signal 206 indicating acceleration of the aircraft in the direction of flight and generated by a flight direction accelerometer 208. Describing the program 190 at first in general terms and with reference to FIGS. 1, 2a–2c and 3a–3f, the program is adapted to generate a fuel flow perturbation signal 196 and a fuel flow correction signal 198 both fed to the summing junction 112 in respect of the engine 102, and a corresponding perturbation and correction signals 200 and 202 fed to the summing junction 113 in respect of the engine 104.

The signals 196, 200 are of opposite sign and have the effect of applying a yaw couple to the aircraft which is balanced by the direction control loop 122, 124 acting on the rudder 130 so that the aircraft does not significantly change flight direction but is subjected by signals 196, 200 to acceleration in the flight direction. The accelerometer 208 responds to acceleration in the flight direction only and is not significantly affected by an spurious yaw changes which might occur in flight. Accelerometers responding to a selected direction of acceleration are well-known. For the purpose of accelerometer 208 the term "flight direction" is synonymous with the direction of the longitudinal axis of the aircraft, although the accelerometer may be adapted to sense the acceleration in the true flight direction, i.e., a direction not necessarily in line with the longitudinal axis of the aircraft. Any increase in thrust as a result of the signals 196, 200 tends to increase speed and causes the speed control loop 108, 110 to reduce fuel flow to keep the speed constant. Thus the effect of the program as a whole is that fuel flow is optimized against a given speed and direction of flight. The speed demand signal 106 and the direction demand signal 120 are preset by the pilot of the aircraft, and it will be understood that devices responsive to such signals for the automatic control of speed and direction of an aircraft are well-known per se.

Figure 2A:
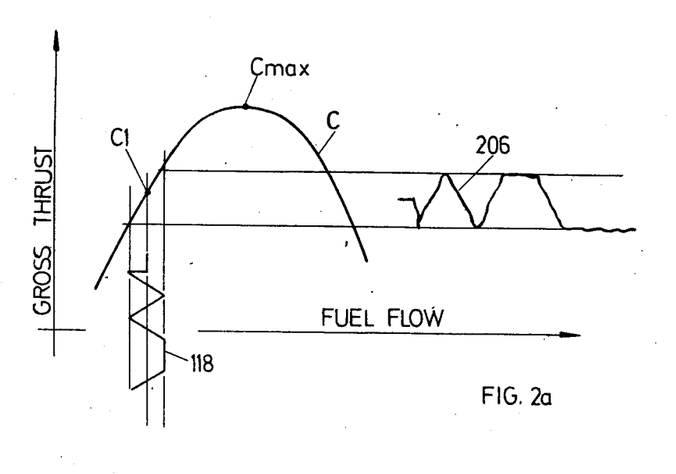
FIGS. 2a-2c are diagrams of characteristics relating to the system.
Figure 2B:
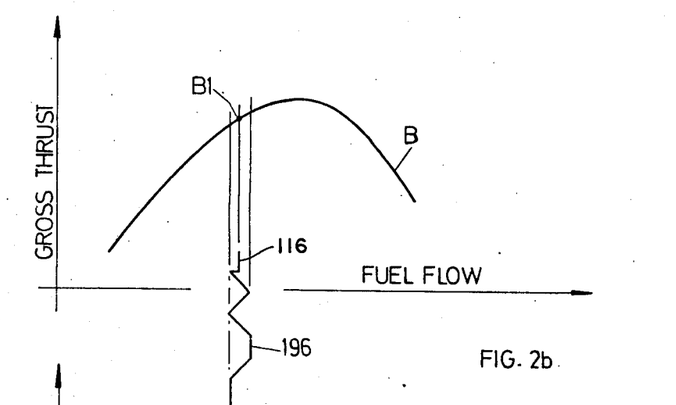
Figure 2C:
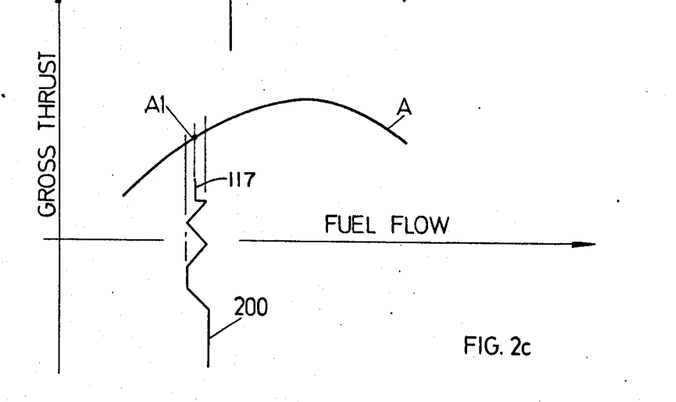

FIGS. 2a, 2b and 2c show the effect of fuel flow changes on the gross thrust of the engines. FIG. 2c shows a characteristic of thrust values A due to changes in the signal 117. FIG. 2b shows a characteristic thrust values B due to changes in the signal 116. For the purposes of example the characteristic of thrust values B is given steeper slopes to show that the engine 102 associated with the signal 116 has a fuel efficiency higher than the engine 104. FIG. 2a shows a characteristic of thrust values C due to the combined effect of changes in the signals 116, 117. The object of the system is to make the signals 116, 117 such that the engines operate at a point C max.

As mentioned the fuel efficiency of engine 102 is assumed to be higher than that of engine 104. Let it be assumed further, that the optimization is already in progress and has caused the signal 116 to be higher than the signal 117, and that the signals 116, 117 are such that the signal 206 is at points A1, B1, C1, respectively, where the slope of the characteristics is positive.

Figure 3A:
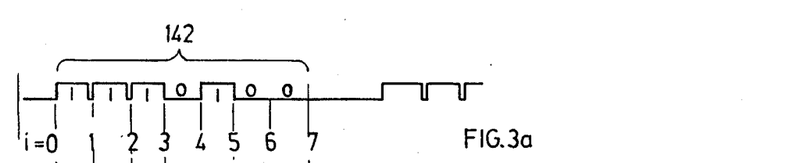
FIGS. 3a-3f are diagrams of signals relating to the system.
Figure 3B:
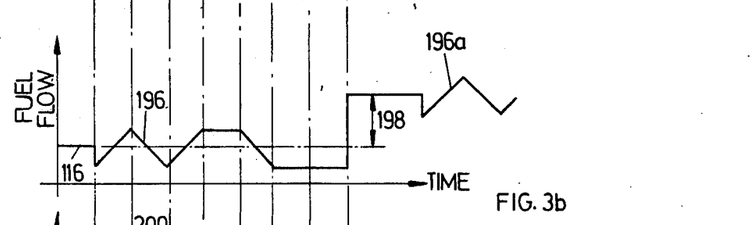
Figure 3C:
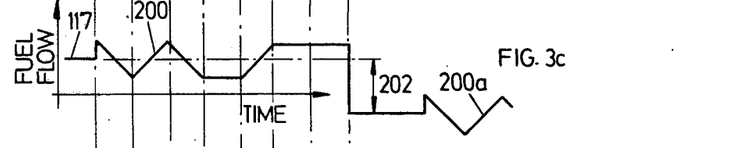
Figure 3D:
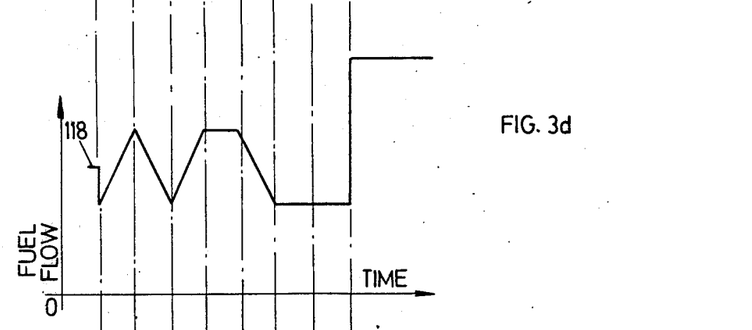
Figure 3E:
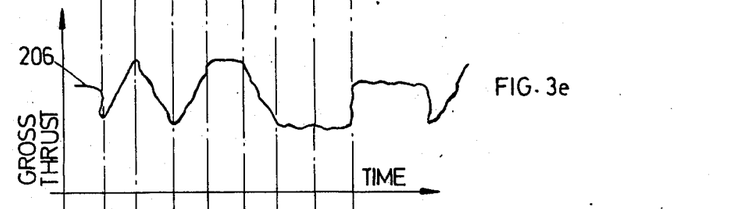
Figure 3F:
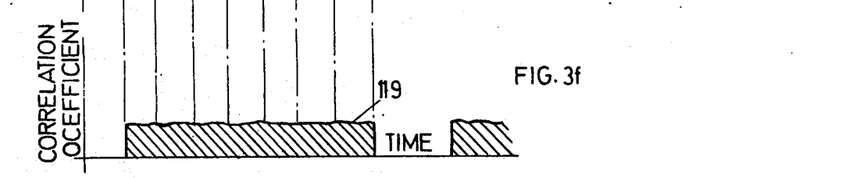

In FIG. 3b and 3c, the signals 116, 117 are shown at levels related to a zero base line and as modified by the signals 196, 200 which are produced in accordance with the signal 142. Note that the signal 117 is inverted so that, as the fuel flow to engine 102 increases, the fuel flow to the other engine decreases and vice versa.

The perturbation applied to the aircraft by the joint effect of the signals 196, 200 is in accordance with a value 118 which is the difference between the signals 196, 200. The consequent perturbation of the gross thrust is as given by the signal 206 in FIG. 2a. In other words the thrust on the aircraft in the flight direction will vary in accordance with a signal determined by the difference between the signals 196, 200. Note that, in the present example, the signal 196 is at a higher level of fuel flow, i.e. the level of the signal 116, than the signal 200. The value 118 therefore essentially follows the signal 196.

To determine the required correction signals to attain C max, the program 190 operates at first to correlate the signals 196, 206 over the period of the signal 142 to produce a correlation coefficient 119, i.e., a measure of the slope of the curve C.

To this end, at each digit $i$ of the signal 142, the sign of the signal 196 is multiplied by the sign and magnitude of the signal 206, and the products are added. The sign of the resulting correlation coefficient is always the same as the slope of the characteristic C at the point concerned. It will be seen that in the present example the coefficient 119 is positive. The correction signal 198 is made the same sign as the correlation coefficient and, in this example, it is given a pre-determined fixed magnitude. The correction signal 202 is made of the same magnitude but of opposite sign. FIGS. 3b and 3c show the two signals 198, 202 superimposed on the signals 116, 117 to raise the one and lower the other signal which satisfies the requirement and the fuel flow to the more efficient engine has to increase and the fuel flow to the less efficient engine decrease for so long as the operation is at the side of the characteristic C having the positive slope.

Repeated applications of the program 190 (the next application of the signals 196, 200 is denoted 196a, 200a, in FIGS. 3b and 3c) will move the value of characteristic C to the point C max. At this point there will be no change in gross thrust due to any change in the ratio of the signals 116, 117; hence the signal 206 will be a horizontal line which makes the correlation coefficient and hence the signals 198, 202 equal to zero.

If the condition of the system changes to the side of the characteristic having the negative slope, then the signals 206 becomes inverted, the correlation coefficient becomes negative, the correction signals reverse sign and the system tends back towards the C max.

It will be noted that, once the optimizing process is under way, the signals 118, 206 tend to follow the perturbations of the more efficient engine, i.e., the engine 102 in the above example. Hence correlation between any one of the signals 196 or 200, and the signal 206 produces a positive correlation coefficient if that one signal goes to the engine which happens to be the more efficient one. Hence application of the correction signal to that engine such that the positive correction signal results in an increase in fuel flow, and application of the opposite correction signal to the other engine, results in a move of the total fuel efficiency towards the optimum.

When the system is brought into operation in the first instance, the signals 116, 117 are of course equal so that the signal 110 and the value 118 are zero, because the signals 196, 200 cancel each other. However, insofar as the fuel efficiencies of the two engines differ, the differing effects of the signals 196, 200 produce a finite change in gross thrust and hence a distinct signal 206 for correlation. If the two efficiencies are the same, the signal 206 is zero and this is of course the optimum conditions in which no action need result.

It will be understood that the time intervals between successive digits $i$ (FIG. 3a) of the signal 142 must suit the time constants of the engines and of the aircraft so that a clear signal 206 is obtainable. A program such as the program 190 and details of the correlation process are described in our said U.S. patent application Ser. No. 785,270, but details of the program as applied to the present invention are described below.

The signals 196, 200 are ramp signals (FIGS. 3b, 3c) which have a succession of positive and negative slopes as shown. A ramp signal, as distinct from a square wave signal, ensures that the fuel flow perturbation is a gradual one. The pattern of the signals 196, 200, i.e., the sequence of positive and negative slopes, is taken from the binary number defining the signal 142. Since the signal 142 is generated by a shift register, it has the shape of a square wave (FIG. 3a) and the program has operations for converting the square wave signal 142 into the ramp signals 196, 200. As shown in FIG. 3a-3f, the signal 142 is processed down to the coefficient 119 on the basis of seven digits $i$ denotes 0 to 6.

The particular shape of the signal 142, namely the non-regularity of the waves arising from the PRBN pattern, is of no significance to this invention. A regular square wave would be equally good. However, a plurality of digits per signal 142 is useful to improve discrimination over noise. Theoretically, i.e., in applications where noise is no problem, a single digit is sufficient to satisfy the purposes of the invention.

The program 190 (FIGS. 7a, 7b) is initiated by the signal 141 and since the program has to take account of the different digits $i$, there is a first operation, 190-1, for setting $i$ to zero. Operation 190-2 is for reading the signal 142 from the register 134. The program includes a loop 190-3 in which the digits 0 to 6 of the signal 142 are processed in turn and the first digit is detected by a decision 190-4. The first digit of the signal 196 is then formed by an operation 190-5 by integration of the signal 142 in a manner known per se. There are corresponding decisions 190, 6, 8, 10, 12, 14 and operations 190, 7, 9, 11, 13, 15 ,17 for the remaining digits 1 to 6. To ensure that alternate ramps of the signal 196 have a negative slope the corresponding integrals are made negative as shown in operations 190-7 and 190-13. Where a digit of the signal 142 is zero, as at digits 3, 5 and 6, the integral will be zero and the signal 196 will extend at a uniform level (FIG. 3b) but this is solely a matter of the above mentioned non-regularity of the signal 142. If the known regular square wave is used the program will be a corresponding regular alternation of positive and negative integrations and the signal 196 will have a regular alternation of positive and negative ramps. Since the computer is a digital one the integrations will be performed in the known step process of discrete additions or substractions and at each such step the program will go through the loop 190-3. The signal 200 is formed at operation 190-18, and the signals 196, 200 are read out to the summing junctions 112, 113 at operations 190-19, 20. The response of the accelerometer 208 is read in at operations 190-21. The correlation coefficient 119 of the signals 196, 100 is formed at operation 190-22 which comprises forming, in respect of each digit $i$ the product of the sign of the signal 196 and the sign and magnitude of the signal 206. If there were only a single digit $i$ (which, as mentioned, is theoretically sufficient for the invention) then the product of such single digit of the signals 196 and 206 would constitute the correlation coefficient. Since there are six digits, their sum is formed thereby to average the effect of the perturbations effected by the signal 196 and in this way improve discrimination over noise. The forming of the coefficient 119 in this way is known per se and is also described in our above mentioned U.S. Pat. application Ser. No. 785,270.

Figure 7A:
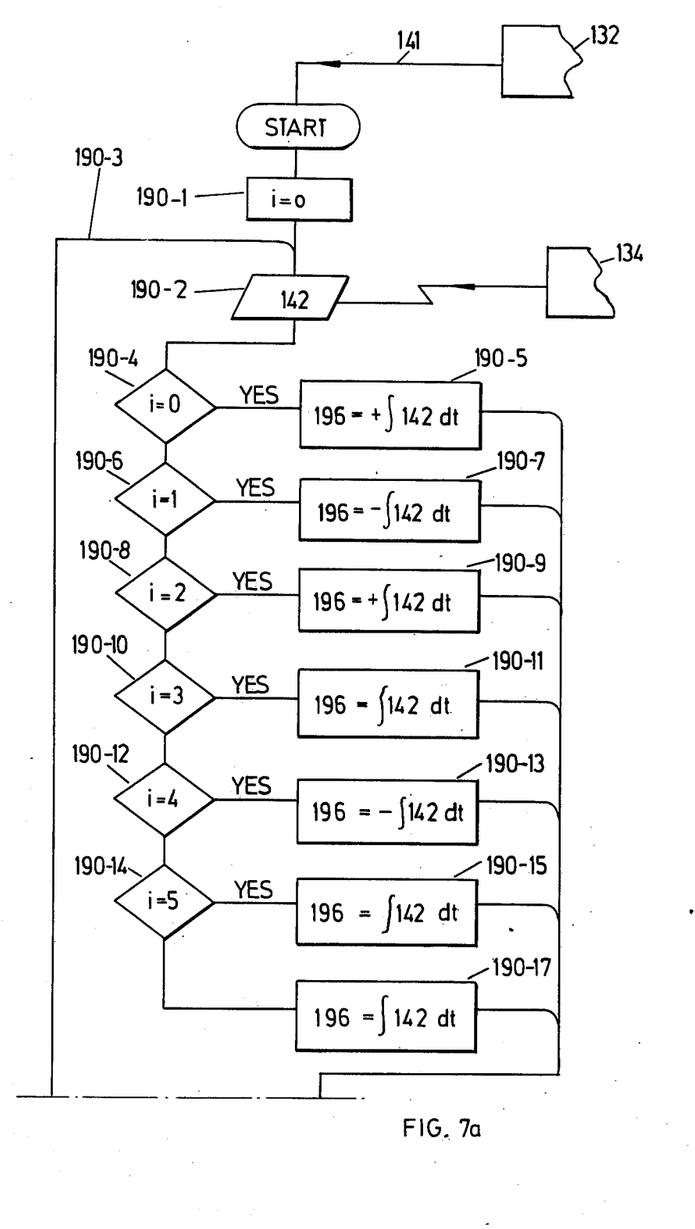
Figure 7B:
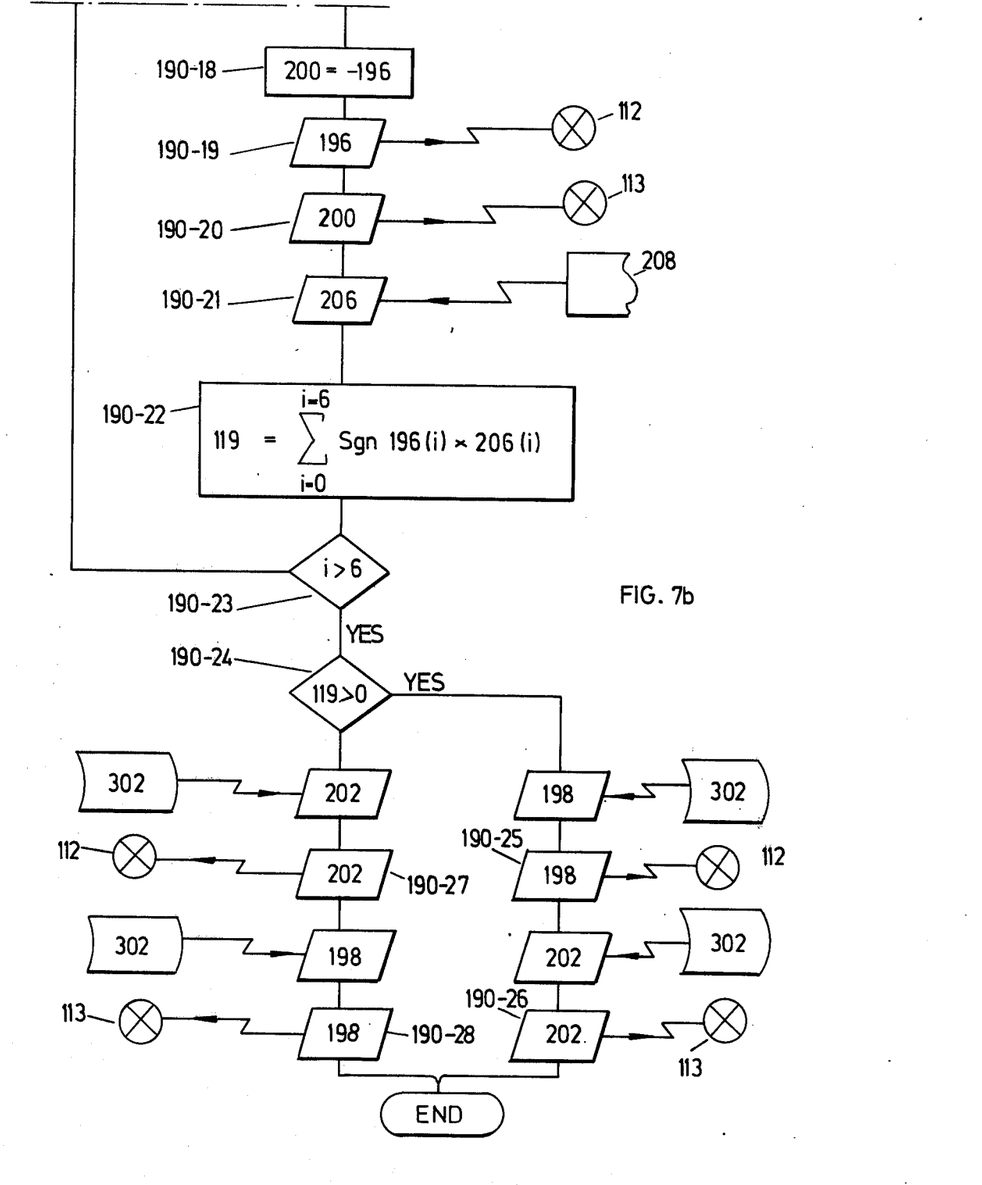

When the coefficient 119 is formed, a decision 190-23 passes the action on to a decision 190-24 which determines whether coefficient 119 is greater than 0, i.e., is positive or negative. If the coefficient 119 is positive operations 190-25, 26 output the signals 198, 202 from store to the summing junctions 112, 113 respectively. If the coefficient 119 is negative operations 190-27, 28 output the signals 198, 202 respectively to the summing junctions 113, 112.

What is claimed is:

1. In an aircraft including: a power plant having at least two engines having respective gross thrust versus fuel flow characteristics and positioned on opposite sides of the longitudinal axis of the aircraft, a speed control loop for maintaining the speed of the aircraft substantially constant, and a direction control loop for maintaining the direction of the aircraft substantially constant, a method for optimizing the operating efficiency of the power plant to account for differences in the efficiencies of the engines by adjustably proportioning fuel flow to the engines, said method comprising the steps of:
   a. simultaneously perturbing the fuel flow to each of said two engines a small amount, the respective perturbations being opposite in sign;
   b. sensing acceleration in the aircraft flight direction produced in response to the perturbation of step (a);
   c. comparing the sign of the perturbation in fuel flow to one of said engines with the sign of acceleration sensed as a result of the perturbations in fuel flow to the engines to determine if said signs are the same or opposite;
   d. if said compared signs are the same, increasing fuel flow to said one engine and decreasing fuel flow by a like amount to the other of said engines;
   e. if said compared signs are opposite, decreasing fuel flow to said one engine and increasing fuel flow by a like amount to said other engine; and
   f. repeating steps (a) through (e) until no net acceleration is sensed in response to perturbations of the fuel flow to said engines.

2. The method according to claim 1 wherein said speed control loop develops a speed signal in electrical form, the amplitude of said speed signal being employed to control fuel flow through two throttle valves for said two engines, respectively, and wherein step (a) comprises the steps of:
   generating two time-varying electrical perturbation signals, one for each engine, the amplitudes of said two perturbation signals having equal but oppositely polarized rates of amplitude change; and
   summing each perturbation signal with said speed signal individually to vary the flow through said throttle valves in accordance with the summed signals.

3. The method according to claim 2 wherein step (b) includes the step of providing an electrical acceleration signal having an amplitude and sign proportional to acceleration of said aircraft in a forward direction, and wherein step (c) comprises the step of electrically multiplying the perturbation signal for said predetermined engine by said electrical signal and monitoring the sign of the product of the multiplication.

4. The method according to claim 3 wherein steps (d) and (e) include the steps of:
   generating an electrical correction signal for each engine;
   changing the amplitudes of said correction signals in opposite senses in accordance with the sign of the product of said multiplication; and
   summing each of said correction signals with the speed signal to further control said throttle valves.

* * * * *